(12) United States Patent
Melnikov et al.

(10) Patent No.: US 9,852,046 B1
(45) Date of Patent: Dec. 26, 2017

(54) METHOD AND SYSTEM FOR AUTOMATED DEBUGGING MEMORY ALLOCATION AND MEMORY RELEASE

(71) Applicant: CADENCE DESIGN SYSTEMS, INC., San Jose, CA (US)

(72) Inventors: Rodion Melnikov, Modiin (IL); Yonatan Ashkenazi, Rehovot (IL); Meir Ovadia, Rosh Ha-ayin (IL)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 271 days.

(21) Appl. No.: 14/706,103

(22) Filed: May 7, 2015

(51) Int. Cl.
G06F 9/44 (2006.01)
G06F 11/36 (2006.01)

(52) U.S. Cl.
CPC ............ G06F 11/3636 (2013.01); G06F 8/70 (2013.01)

(58) Field of Classification Search
None
See application file for complete search history.

(56) References Cited

U.S. PATENT DOCUMENTS

| | | | | |
|---|---|---|---|---|
| 5,689,707 A | * | 11/1997 | Donnelly | G06F 11/366 |
| 6,226,761 B1 | * | 5/2001 | Berstis | G06F 12/0253 707/999.202 |
| 6,446,257 B1 | * | 9/2002 | Pradhan | G06F 12/0276 707/999.202 |
| 6,539,396 B1 | * | 3/2003 | Bowman-Amuah | G06F 17/30607 707/769 |
| 6,658,653 B1 | * | 12/2003 | Bates | G06F 11/366 714/E11.211 |
| 8,566,559 B2 | * | 10/2013 | Schmich | G06F 11/3636 707/813 |
| 8,667,471 B2 | * | 3/2014 | Wintergerst | G06F 11/3612 717/124 |
| 2001/0013117 A1 | * | 8/2001 | Ungar | G06F 11/0718 717/141 |
| 2002/0120823 A1 | * | 8/2002 | Kolodner | G06F 11/3466 711/170 |
| 2002/0194191 A1 | * | 12/2002 | Sexton | G06F 17/241 |
| 2003/0058277 A1 | * | 3/2003 | Bowman-Amuah | G06F 17/30607 715/765 |
| 2003/0140071 A1 | * | 7/2003 | Kawamoto | G06F 12/0269 |

(Continued)

*Primary Examiner* — Isaac T Tecklu
(74) *Attorney, Agent, or Firm* — Pearl Cohen Zedek Latzer Baratz LLP

(57) ABSTRACT

A method and system for debugging memory allocation and memory release may include recording execution events of an execution run of a program including data related to objects pertaining to that program, and data related to object association pertaining to that program at a plurality of points in time. The method may also include receiving via a user interface a user selection of an object of said objects. The method may further include identifying one or a plurality of pointers pointing from one or a plurality of objects at the selected object based on the recorded data related to object association and finding one or a plurality of execution events of said execution events corresponding to assignments of said one or a plurality of pointers. The method may further include distinctly marking a portion of the code, presented to the user on a display device, representing said one or a plurality of execution events that correspond to assignments of said one or a plurality of pointers.

20 Claims, 3 Drawing Sheets

(56) References Cited

U.S. PATENT DOCUMENTS

| | | | | |
|---|---|---|---|---|
| 2003/0229766 A1* | 12/2003 | Dice | .................... | G06F 12/0261 |
| | | | | 711/154 |
| 2005/0028168 A1* | 2/2005 | Marcjan | .............. | G06F 21/6227 |
| | | | | 719/315 |
| 2005/0172271 A1* | 8/2005 | Spertus | ............... | G06F 11/3664 |
| | | | | 717/125 |
| 2006/0074988 A1* | 4/2006 | Imanishi | ............. | G06F 12/0269 |
| 2007/0250820 A1* | 10/2007 | Edwards | ............. | G06F 11/3636 |
| | | | | 717/131 |
| 2008/0162611 A1* | 7/2008 | Wolczko | ............. | G06F 12/0276 |
| 2008/0244547 A1* | 10/2008 | Wintergerst | ........ | G06F 11/3466 |
| | | | | 717/158 |
| 2008/0301644 A1* | 12/2008 | Drepper | .............. | G06F 9/44589 |
| | | | | 717/124 |
| 2010/0262954 A1* | 10/2010 | Roos | ........................ | G06F 11/36 |
| | | | | 717/128 |
| 2011/0087713 A1* | 4/2011 | Beard | ................. | G06F 12/0269 |
| | | | | 707/816 |
| 2011/0191393 A1* | 8/2011 | Schatzl | ................... | G06F 17/30 |
| | | | | 707/816 |
| 2011/0238940 A1* | 9/2011 | Hashiguchi | ........... | G06F 11/073 |
| | | | | 711/165 |
| 2011/0289482 A1* | 11/2011 | Bentley | ................. | G06F 11/366 |
| | | | | 717/125 |
| 2011/0302183 A1* | 12/2011 | Van De Vanter | ......... | G06F 9/44 |
| | | | | 707/758 |
| 2012/0204165 A1* | 8/2012 | Gupta | ................... | G06F 11/366 |
| | | | | 717/153 |
| 2015/0067293 A1* | 3/2015 | Flood | ................. | G06F 12/0269 |
| | | | | 711/170 |
| 2015/0227414 A1* | 8/2015 | Varma | ................... | G06F 11/073 |
| | | | | 714/47.1 |

* cited by examiner

METHOD AND SYSTEM FOR AUTOMATED DEBUGGING MEMORY ALLOCATION AND MEMORY RELEASE

FIELD OF THE INVENTION

The present disclosure relates to computer memory management. More specifically, the present invention relates to a method and system for automated debugging memory allocation and memory release.

BACKGROUND OF THE INVENTION

Memory management typically seeks to provide ways to dynamically and efficiently allocate memory space to a program, and free memory space for reuse when the data taking up these parts is no longer required by that program.

In the context of the present specification, "memory" generally refers to Random-Access-Memory (RAM), unless specifically indicated otherwise.

Incorrectly managing memory allocations may lead to memory leak. Memory leak occurs when memory is used up by data which is no longer required and is not released for future use.

Garbage collection is a memory management method aimed at avoiding memory leaks, that involves identifying objects in memory that are no longer required by the running program or programs (hereinafter—unnecessary objects) and freeing memory space in which these objects are found for reuse. Basically, garbage collection is an automated method. Garbage collection typically uses significant processing time and resources.

The most commonly used method of garbage collection is tracing garbage collection. This method involves tracing objects in memory which are called or otherwise reached by a reference or a chain of references from other objects ("root objects") in the memory. Objects which are not referenced by root objects are considered garbage and are collected (e.g., memory is freed). Various algorithms are known for tracing garbage collection.

SUMMARY OF THE INVENTION

There is thus provided, according to some embodiments of the present invention, a method for debugging memory allocation and memory release. The method may include recording execution events of an execution run of a program including data related to objects pertaining to that program, and data related to object association pertaining to that program at a plurality of points in time. The method may also include receiving via a user interface a user selection of an object of said objects. The method may further include identifying one or a plurality of pointers pointing from one or a plurality of objects at the selected object based on the recorded data related to object association and finding one or a plurality of execution events of said execution events corresponding to assignments of said one or a plurality of pointers. The method may further include distinctly marking a portion of the code, presented to the user on a display device, representing said one or a plurality of execution events that correspond to assignments of said one or a plurality of pointers.

In some embodiments of the invention, the method may include performing an automated analysis on the recorded data related to object association and recorded execution events to find one or a plurality of objects of interest and mark a portion of the code, presented to the user on a display device, representing one or a plurality of said execution events that correspond to assignments of one or a plurality of pointers, pointing at said one or a plurality of objects of interest.

According to some embodiments, the method may include generating an object association graph for the objects from the recorded data related to object association, for one or a plurality of points of time of said plurality of points in time.

In some embodiments, the method may include saving object characteristics of the one or a plurality of objects to a database.

According to some embodiments, the object characteristics may be size, cause for non-erasure, object or objects that point at the selected object, and/or names of fields through which they point at the selected object.

In some embodiments of the invention, the method may also include identifying one or a plurality of objects that have assigned pointers to the selected object and information about fields relating to the pointers in data related to the object association for a given point of time.

In some embodiments, the method may further include identifying, based on the identified one or a plurality of objects that have assigned pointers to the selected object, one or a plurality of execution events of said execution events corresponding to the assigned pointers relating to a point in time that is same or closest in the past to the given point of time.

BRIEF DESCRIPTION OF THE DRAWINGS

In order to better understand the present invention and appreciate its practical applications, the following figures are provided and referenced hereafter. It should be noted that the figures are given as examples only and in no way limit the scope of the invention. Like components are denoted by like reference numerals.

DETAILED DESCRIPTION OF THE INVENTION

Figure 1:
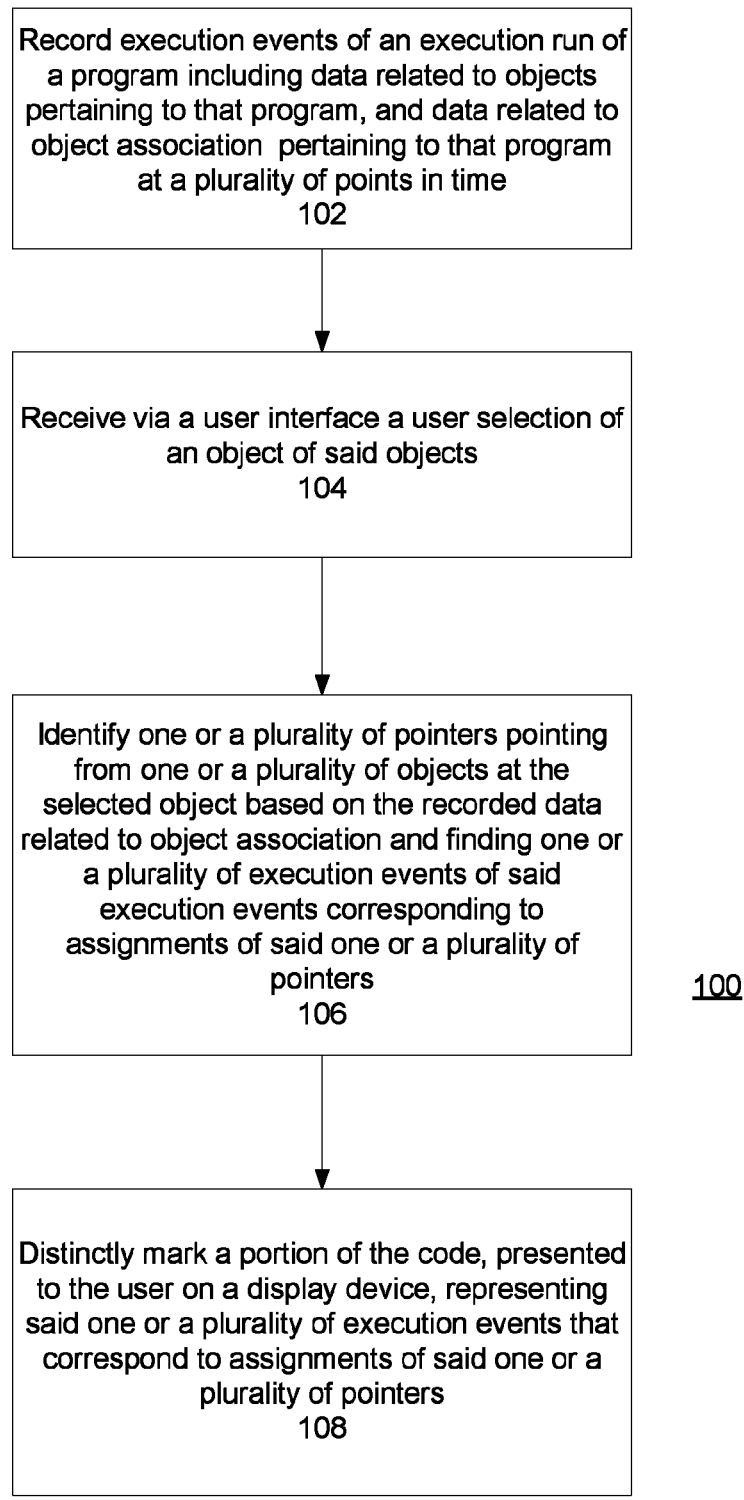
FIG. 1 illustrates a method for debugging memory allocation and memory release according to some embodiments of the present invention.

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

Some programming languages, such as C, C++, etc. require the user to manually free memory space, by indicating which objects in memory are no longer required and actively causing their deletion. An "object" is a location in memory holding a values (called "fields" in most programming languages) and in many cases also referenced by an identifier (also known as a pointer); some of the values may be pointers to other objects.

Other programming languages—general purpose object oriented languages, such as, for example, Java, C Sharp, System Verilog, e (the last two are hardware verification languages—HVLs), etc., are designed to automatically perform garbage collection. Typically, the engine of such languages performs garbage collection as part of its tasks. In essence, the language engine of such languages checks to find existing pointers to objects, and when objects with no such pointers are found these objects are considered garbage and are collected (e.g., deleted from memory).

However, a program may contain bugs—a general term referring to flaws, errors, or faults in the program (or the system on which the program is running), that cause the program to produce unexpected results or act in unintended ways. Specifically, some bugs may cause erroneous or irrelevant referrals (also called hereinafter—pointers) to one or a plurality of objects to appear unintentionally or remain after the program no longer requires them. For example, a debugging expert may debug a program and make sure undesired pointers are removed during the program execution, yet erroneously overlook one or a few pointers. In another example, a list is maintained in a container and updated by adding more and more items to the list, yet, later, when the list is no longer required it still remains and occupies memory. Such bugs cause allocation of memory but no subsequent release of that memory, when in fact there is no longer a reason to keep that memory allocated. As a result, less memory remains available for the running program. This phenomenon, which is hereinafter as "memory leak", may seriously affect the execution of a program and may, in some cases, even prevent it from running properly. As more and more memory is leaked and becomes unavailable for future use by the program (as it unintentionally remains allocated), the program may find less and less free memory which it can use. In severe cases not enough memory remains, causing malfunction and in some cases halting the execution of the program.

Memory leakage is in particular an issue in debugging environments. In a properly functioning program, when an object is no longer required any pointer pointing at that object is removed, facilitating regular garbage collection by the memory management of the language engine. Yet, an undebugged program may contain bugs that allow pointers to point at objects that the program no longer needs unintentionally to remain, preventing release of the memory that contains these objects.

Some memory management environments employ memory profiling to identify and map objects that are generated during the execution of a program, such as, for example, Jprof (Java Profiler). The memory profiler collects data associated with these objects (e.g., object identification (ID), object size, etc.). However, typically, a memory profiler is not concerned with the causes for the existence of any particular object, and it cannot be usually determined by the memory profiler.

A debugging tool typically allows a programming expert (hereinafter—"programmer" or "user") to follow the execution of a software program or an electronic hardware design (hereinafter, for the sake of brevity, collectively—program) detect anomalies and figure out their cause or causes. Typically a debugging tool displays a source code or assembly code of the program under test on a user interface (hereinafter referred to as UI). The debugging tool offers various functions, such as performing break point setting, step execution, and the like. For example, in step execution using the UI, the debugging tool executes one or several lines of the source code or one instruction of the assembly code, and if there is a problematic code which leads to an error in a result of execution of the one instruction of the source code or assembly code, the debugging tool highlights a problematic portion or displays an auxiliary code, message, or the like which represents details of the error. The ability to examine an execution of a program step by step helps a human user to find anomalies (bugs) and fix them (debug).

A post-process debugging method was introduced which involves recording a specific program execution and allowing an on-line or off-line analysis of that execution. When recording the execution, typically all execution events that had occurred in that execution are saved.

An "execution event" typically refers to any event that has occurred during the execution of the program and may include, for example, a code line that was executed, a routine that was called, a parameter that was calculated, a variable that has been assigned a value, a status of a computing environment, an indication (e.g., text, line, or location within a source code representation or other representation of the software program being debugged, a function currently being executed, an instruction that called the function being currently executed, or other indication) of an instruction that is being executed or that was most recently executed, an address of a variable or instruction, or other relevant information that may be displayed or otherwise made available to a user of the debugging tool, etc.

Information relating to the execution events encountered during an execution is saved (e.g., into a database, memory, etc.), allowing the review of the recorded execution in a user interface while mimicking the look and feel of a regular debugging tool. Thus, the human user (hereinafter—user) can go back and forth (up to the last execution event that was recorded) and view various execution events of that specific execution, including the related information of these events. Using such a post-process debug method allows the user to analyze any execution event and find the execution events that caused it to occur the way it did.

According to some examples, a post process debugger records information relating to a specific execution of a program under test and is designed to utilize that information so as to mimic a look and feel of a "regular" debugger. Using the saved information the post process debugger may show all the instances in which a given code line was executed, and what were the values of the variables, parameters and/or other fields found in a code line or in the scope of that code line for each instance. The post process debugger may also record all the messages that were printed while running the program, and may have a specially designated graphical user interface (GUI) that presents these messages and allows filtering them in one or various ways.

FIG. 1 illustrates a method for debugging memory allocation and memory release according to some embodiments of the present invention. Method 100 may include recording 102 execution events of an execution run of a program including data related to objects pertaining to that program, and data related to object association pertaining to that program at a plurality of points in time. Method 100 may also include receiving 104 via a user interface a user selection of an object of said objects. Method 100 may further include identifying 106 one or a plurality of pointers pointing from one or a plurality of objects at the selected object based on the recorded data related to object association and finding one or a plurality of execution events of said execution events corresponding to assignments of said one or a plurality of pointers. Method 100 may further include distinctly marking 108 a portion of the code, presented to the user on a display device, representing said one or a plurality of execution events that correspond to assignments of said one or a plurality of pointers.

The user interface may be, for example, a user interface of a debugging tool, e.g., graphical user interface—GUI.

The information on said one or a plurality of pointers may include, for example, information may be presented to the user in various ways. For example, these one or a plurality of code segments may be highlighted, marked by a marker (e.g., an arrow) or otherwise indicated, so that the attention of the user would be drawn to that segment, or segments.

In some embodiments of the present invention, a memory manager may seek objects that are currently non-erasable (that is, the standard language engine did not free memory holding these objects). The objects may include, for example, current threads, chains of calls, routines, etc.

In some embodiments of the invention, an automated analysis may be performed on the recorded data related to object association and recorded execution events to find one or a plurality of objects of interest and mark a portion of the code, presented to the user on a display device, representing one or a plurality of said execution events that correspond to assignments of one or a plurality of pointers, pointing at said one or a plurality of objects of interest.

According to some embodiments, an object association graph may be generated for the objects from the recorded data related to object association, for one or a plurality of points of time of said plurality of points in time.

In some embodiments, object characteristics of the one or a plurality of objects may be saved to a database.

According to some embodiments, the object characteristics may be size, cause for non-erasure, object or objects that point at the selected object, and/or names of fields through which they point at the selected object.

In some embodiments of the invention, one or a plurality of objects may be identified that have assigned pointers to the selected object and information about fields relating to the pointers in data related to the object association for a given point of time.

In some embodiments, based on the identified one or a plurality of objects that have assigned pointers to the selected object, one or a plurality of execution events of said execution events corresponding to the assigned pointers relating to a point in time may be identified, that is same or closest in the past to the given point of time.

Figure 2B:
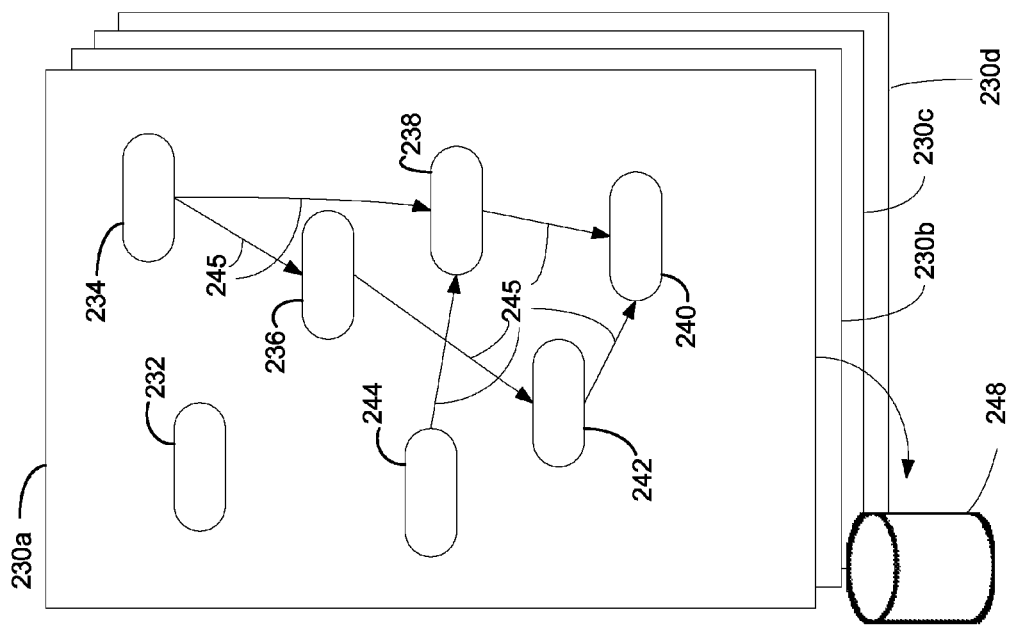
FIG. 2B illustrates a plurality of object association graphs, according to some embodiments of the present invention.
Figure 2A:
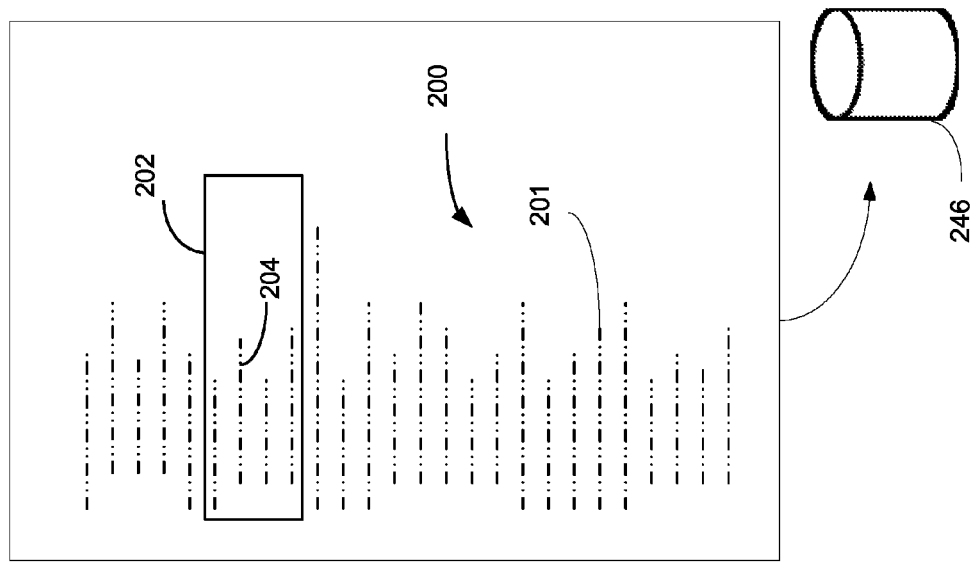
FIG. 2A illustrates an example for a graphical user interface (GUI) of a post-process debugging tool, according to some embodiments of the present invention.

FIG. 2A illustrates an example for a very basic GUI 200 of a post-process debugging tool, according to some embodiments of the present invention. GUI 200 presents some or all of a program code 201 to be debugged. A view 202 highlights a section of the code, which typically includes execution events, including code 204 associated with one or a plurality of objects (e.g. object defining code, object referral code, etc.). The post process debugging tool is designed to communicate and interact (e.g., read, write) with an execution event database 246, where recorded execution events of a specific execution run (or a plurality of execution runs) may be saved.

FIG. 2B illustrates a plurality of object association graphs, e.g., 230a, 230b, 230c, 230d, according to some embodiments of the present invention.

In some embodiments of the present invention, a plurality of object association graphs, e.g., 230a, 230b, 230c, 230d may be generated, indicating pointing relations between objects (e.g., objects 232, 234, 236, 238, 240, 242, 246) of a program. The object association graphs are generated at different times, depicting current association between objects for each particular time, with objects at nodes of the graph and one or a plurality the edges 245 connecting an object to one or a plurality of other objects that object is pointing at. Unassociated objects that are not pointed at (e.g., 232) may be identified in the graph so that those objects may then be deleted from memory, freeing memory that was allocated for these objects. Objects that are being pointed at cannot be deleted from memory and a user may want to investigate the reason or reasons why the associations to those objects still remain.

Identification (ID) of objects pertaining to the execution of the program may be recorded, as well as other characteristics of the objects, such as, for example, their size, cause of non-erasure, and object or objects that point at these objects. The object association data may be saved in an object association database 248. The object association database may be built to include historical account of object associations.

In some embodiments of the present invention, only characteristics of objects that are not garbage collected because they are being pointed to by root objects (transitively or directly) may be recorded, right after a garbage collection takes place.

In some embodiments of the present invention, the recorded execution event data may be saved in a database and the object association graph data may be saved in another database. The data in the two databases may be used to allow a user debugging a program using a post process debugging tool that makes use of both the recorded execution events data and the object association data so as to allow the user to identify associations between objects of a program being debugged, determine whether certain objects are erroneously pointed at due to a bug, identify the cause for this erroneous pointing and fix that.

According to some embodiments, a user of a post process debugger may wish to explore an object of a particular interest in an object association graph that depicts object associations of the tested program at a particular point in time, from the plurality of object association graphs that were saved in object association database 248 (FIG. 2B). In some embodiments, a user interface may be provided to allow the user to select the object of interest. After the object is selected, the debugger may determine, from the object association data, the pointer or pointers that point to the selected object and the objects that hold those pointer or pointers. Then, the debugging tool may locate these origins in the form of code portion or portions in the program code, using the recorded data of the execution events, that was saved on the execution events database 246. The code portion or portions that forms the origins of the pointer or pointers to the selected object may be highlighted, or otherwise indicated in the program code that is displayed via a user interface on a display device, so that the user may direct his or hers attention to the code and determine whether there is a bug in the code, which may then lead to fixing that bug.

Identifying the entity of the program that is still pointing at that object in that particular time stamp, and the code in which the association between the two took place may be performed, for example, as follows.

The execution events database holds records of recorded execution events, and may include, for example, time, object ID, object name, pointer name and a value for every time an assignment happens during the program run, along with the file and line in the code that caused the assignment. The object association database includes similar or substantially similar information, and the time stamps for which object association graphs (230a-d) can be restored based on information recorded in the object association database 248. Thus, when the user selects an object from the data association database, e.g., using a user interface of the debugging tool, all the objects that hold a pointer to the selected object may be found and for each it may be determined what are the Object ID and the field name (the identifier of the pointer to selected object according to the programming language) that point to the selected object. Such Object ID and field name can be used to find the record of the assignment of the pointer to the selected object in the execution events database 246 by searching for the latest entry in that database with that object ID and field name that happened prior to the time to which the relevant object association graph relates. It should be noted that at that found record—the value that was assigned is the pointer to the selected object itself.

In some embodiments of the present invention, the debug tool may perform an automated analysis on the recorded object association data and recorded execution events to find one or a plurality of objects of interest and mark them distinctly for the user on a code portion that is presented on a display device, e.g., via a user interface.

Combining data from the execution events database and the object association database facilitates identifying associations of objects in the execution event database at any given time, allowing the debugging expert to easily find the line in which the association took place, and from there, using the post process debug tool, find the cause or causes for the existence of objects that were not supposed to remain at a given time of the recorded execution of the program.

Figure 3:
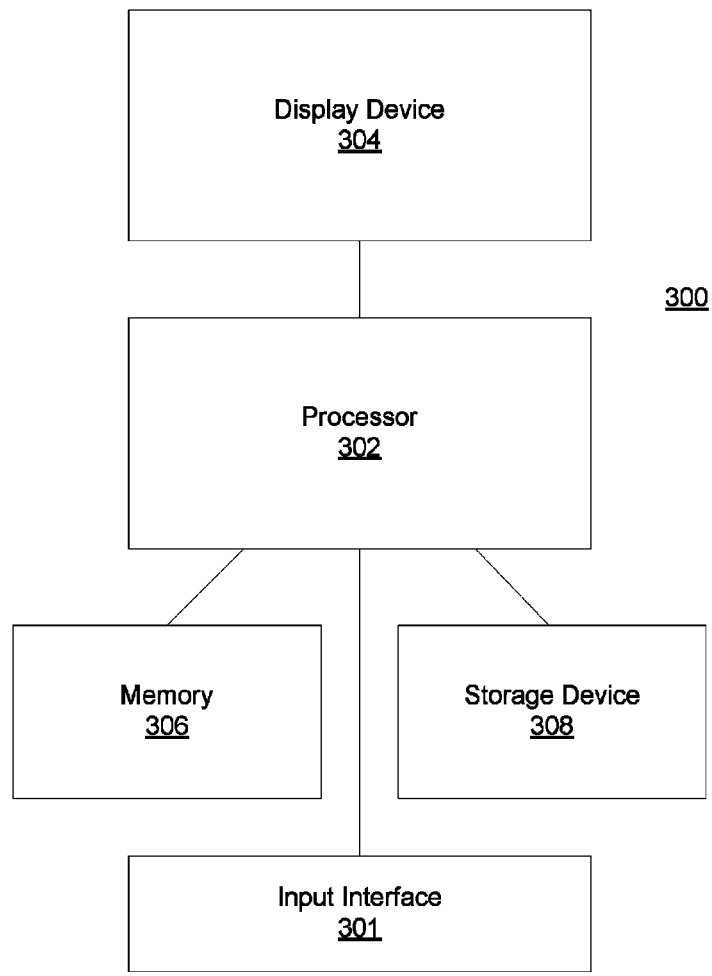
FIG. 3 illustrates a system for debugging memory allocation and memory release, according to some embodiments of the present invention.

FIG. 3 illustrates a system 300 for debugging memory allocation and memory release, according to some embodiments of the present invention.

System 300 may include a processing unit 302 (e.g., one or a plurality of processors, on a single machine or distributed on a plurality of machines) for executing a method according to some embodiments of the present invention.

System 300 may include an input interface 301 for receiving data and instructions from a user, such as, for example, one or a plurality of keyboards, pointing devices, touch sensitive surfaces (e.g. touch sensitive screens), etc. for allowing a user to input commands and data. Processing unit 302 may be linked with memory 306 on which a program implementing a method according to some embodiments of the present invention and corresponding data may be loaded and run from and data may be saved, and storage device 308, which includes a non-transitory computer readable medium (or mediums) such as, for example, one or a plurality of hard disks, flash memory devices, etc. on which a program implementing a method according to some embodiments of the present invention and corresponding data may be stored. System 300 may further include an output device 304 (e.g., display device such as CRT, LCD, LED etc.) on which one or a plurality user interfaces associated with a program implementing a method according to some embodiments and corresponding data may be presented.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples, the instructions stores on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

The invention claimed is:

1. A method for automated debugging memory allocation and memory release, the method comprising:
    recording execution events of an execution run of a program including data related to objects pertaining to that program, and data related to object association pertaining to that program at a plurality of points in time during the execution run;
    during post-process debugging after the execution run, receiving via a user interface a user selection of an object of said objects;

identifying one or a plurality of pointers pointing from one or a plurality of objects at the selected object based on the recorded data related to object association and finding one or a plurality of execution events of said execution events corresponding to assignments of said one or a plurality of pointers; and distinctly marking a portion of the code, presented to the user on a display device, representing said one or a plurality of execution events that correspond to assignments of said one or a plurality of pointers.

2. The method of claim 1, further comprising performing an automated analysis on the recorded data related to object association and recorded execution events to find one or a plurality of objects of interest and mark a portion of the code, presented to the user on a display device, representing one or a plurality of said execution events that correspond to assignments of one or a plurality of pointers, pointing at said one or a plurality of objects of interest.

3. The method of claim 1, further comprising generating an object association graph for the objects from the recorded data related to object association, for one or a plurality of points of time of said plurality of points in time.

4. The method of claim 3, further comprising saving object characteristics of the one or a plurality of objects to a database.

5. The method of claim 4, wherein the object characteristics are selected from the group of object characteristics consisting of size, cause for non-erasure, object or objects that point at the selected object, and names of fields through which they point at the selected object.

6. The method of claim 1, further comprising identifying one or a plurality of objects that have assigned pointers to the selected object and information about fields relating to the pointers in data related to the object association for a given point of time.

7. The method of claim 6, further comprising, based on the identified one or a plurality of objects that have assigned pointers to the selected object, identifying one or a plurality of execution events of said execution events corresponding to the assigned pointers relating to a point in time that is same or closest in the past to the given point of time.

8. A non-transitory computer readable storage medium for automated debugging memory allocation and memory release, having stored thereon instructions that when executed by a processor will cause the processor to:
    record execution events of an execution run of a program including data related to objects pertaining to that program, and data related to object association pertaining to that program at a plurality of points in time during the execution run;
    during post-process debugging after the execution run, receive via a user interface a user selection of an object of said objects;
    identify one or a plurality of pointers pointing from one or a plurality of objects at the selected object based on the recorded data related to object association and finding one or a plurality of execution events of said execution events corresponding to assignments of said one or a plurality of pointers; and
    distinctly mark a portion of the code, presented to the user on a display device, representing said one or a plurality of execution events that correspond to assignments of said one or a plurality of pointers.

9. The non-transitory computer readable storage medium of claim 8, further having stored thereon instructions that when executed by a processor will cause the processor to perform an automated analysis on the recorded data related to object association and recorded execution events to find one or a plurality of objects of interest and mark a portion of the code, presented to the user on a display device, representing one or a plurality of said execution events that correspond to assignments of one or a plurality of pointers, pointing at said one or a plurality of objects of interest.

10. The non-transitory computer readable storage medium of claim 8, further having stored thereon instructions that when executed by a processor will cause the processor to generate an object association graph for the objects from the recorded data related to object association, for one or a plurality of points of time of said plurality of points in time.

11. The non-transitory computer readable storage medium of claim 10, further having stored thereon instructions that when executed by a processor will cause the processor to save object characteristics of the one or a plurality of objects to a database.

12. The non-transitory computer readable storage medium of claim 10, wherein the object characteristics are selected from the group of object characteristics consisting of size, cause for non-erasure, object or objects that point at the selected object, and names of fields through which they point at the selected object.

13. The non-transitory computer readable storage medium of claim 8, further having stored thereon instructions that when executed by a processor will cause the processor to identify one or a plurality of objects that have assigned pointers to the selected object and information about fields relating to the pointers in data related to the object association for a given point of time.

14. The non-transitory computer readable storage medium of claim 13, further having stored thereon instructions that when executed by a processor will cause the processor to identify, based on the identified one or a plurality of objects that have assigned pointers to the selected object, one or a plurality of execution events of said execution events corresponding to the assigned pointers relating to a point in time that is same or closest in the past to the given point of time.

15. A system for automated debugging memory allocation and memory release, the system comprising:
    a storage device; and
    a processing unit, coupled to the storage device and configured to:
    record execution events of an execution run of a program including data related to objects pertaining to that program, and data related to object association pertaining to that program at a plurality of points in time during the execution run;
    during post-process debugging after the execution run, receive via a user interface a user selection of an object of said objects;
    identify one or a plurality of pointers pointing from one or a plurality of objects at the selected object based on the recorded data related to object association and finding one or a plurality of execution events of said execution events corresponding to assignments of said one or a plurality of pointers; and
    distinctly mark a portion of the code, presented to the user on a display device, representing said one or a plurality of execution events that correspond to assignments of said one or a plurality of pointers.

16. The system of claim 15, wherein the processing unit is further configured to perform an automated analysis on the recorded data related to object association and recorded execution events to find one or a plurality of objects of interest and mark a portion of the code, presented to the user on a display device, representing one or a plurality of said execution events that correspond to assignments of one or a plurality of pointers, pointing at said one or a plurality of objects of interest.

17. The system of claim 15, wherein the processing unit is further configured to generate an object association graph for the objects from the recorded data related to object association, for one or a plurality of points of time of said plurality of points in time.

18. The system of claim 16, wherein the processing unit is further configured to save object characteristics of the one or a plurality of objects to a database.

19. The system of claim 13, wherein the processing unit is further configured to identify, based on the identified one or a plurality of objects that have assigned pointers to the selected object, one or a plurality of execution events of said execution events corresponding to the assigned pointers relating to a point in time that is same or closest in the past to the given point of time.

20. The system of claim 19, wherein the processing unit is further configured to identify, based on the identified one or a plurality of objects that have assigned pointers to the selected object, one or a plurality of execution events of said execution events corresponding to the assigned pointers relating to a point in time that is same or closest in the past to the given point of time.

* * * * *